Patented May 11, 1954

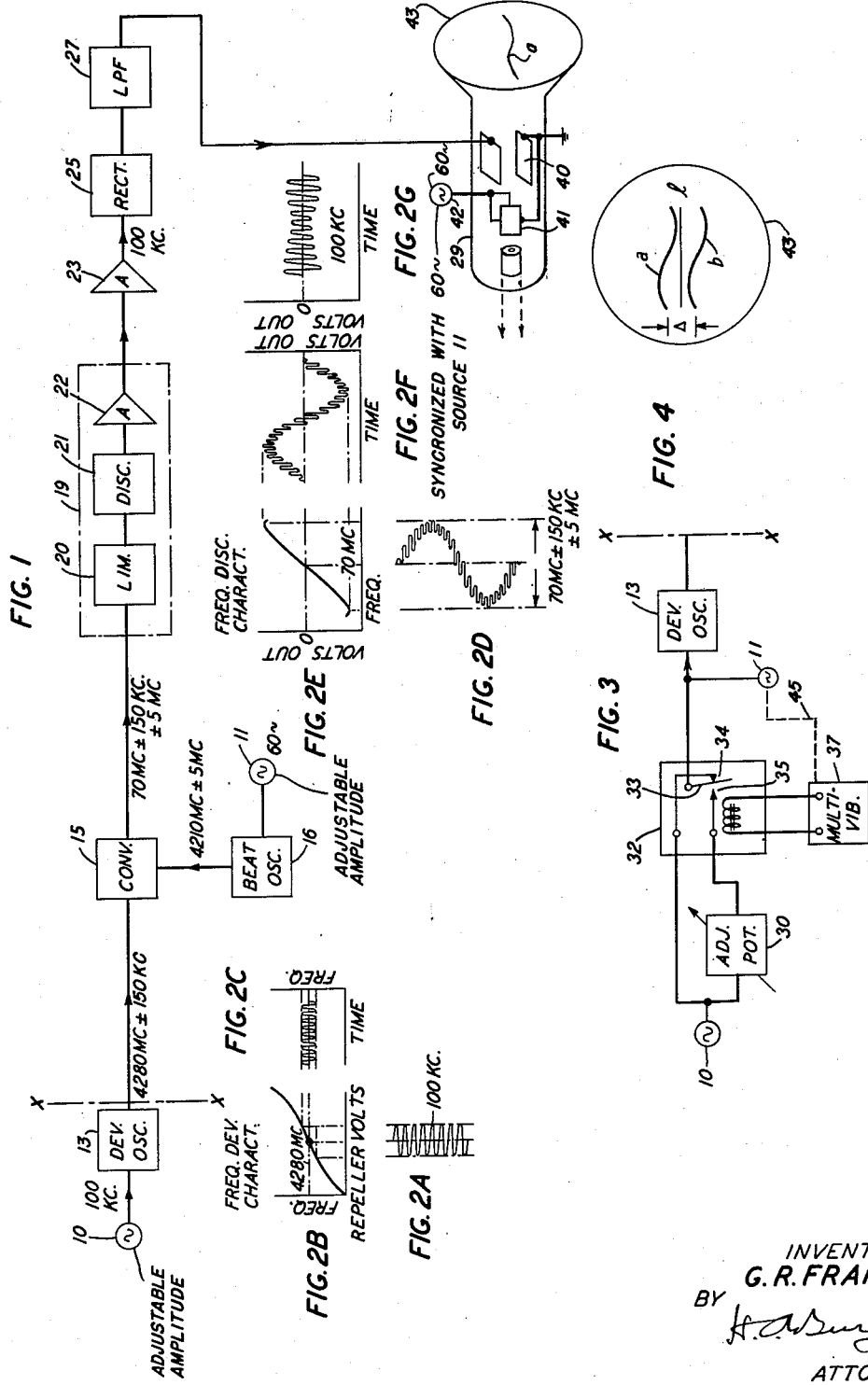

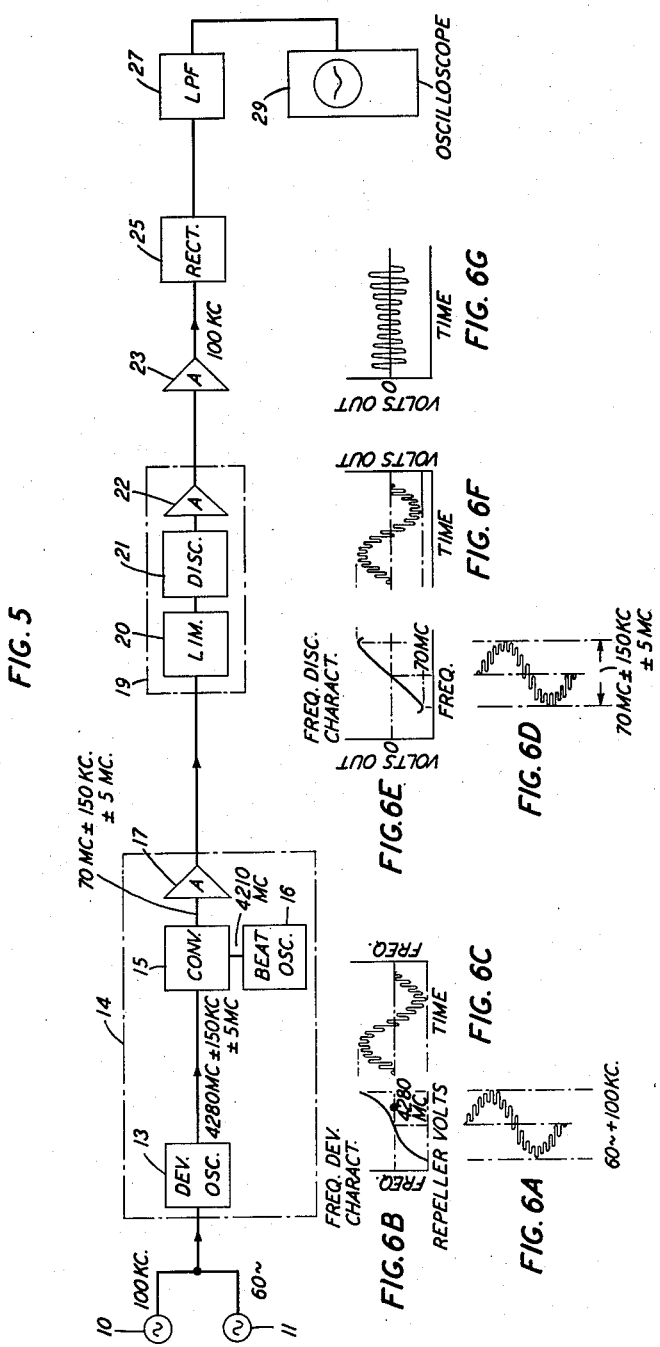

2,678,383

UNITED STATES PATENT OFFICE 2,678,383

LINEARITY MEASURING SCHEME

Glenn R. Frantz, Westfield, N. J., assignor to Bell Telephone Laboratories, Incorporated, New York, N. Y., a corporation of New York Application June 27, 1950, Serial No. 170,647

12 Claims. (Cl. 250—20)

This invention relates to methods of an apparatus for measuring the non-linearity of an electrical system or device, the response of which is a non-linear function of some parameter of an applied input signal, and more particularly for ascertaining the non-linearity of the response characteristics of frequency-sensitive devices and the over-all non-linearity of systems including frequency-sensitive devices.

Most electrical circuits composed of lumped circuit elements exhibit linear response characteristics. There are, however a number of electrical devices and circuit combinations thereof whose response characteristics are a non-linear function of some parameter of an applied input signal. Common forms of non-linear amplitude-response characteristics are the direct-current voltage versus current relationship of a thyrite resistance element, the frequency versus output voltage relationship of frequency sensitive circuits such as frequency-modulation receivers, and the over-all input versus output voltage relationship of various forms of electrical transducers including amplifiers and communications and television transmission systems.

A measure of the non-linearity of an electrical system or device is the maximum departure from constant slope of the characteristic curve representing the response of the system or device to some parameter of an applied input signal over its normal operating range of input parameter values.

In high frequency communications and television transmission systems, wherein several frequency channels are transmitted simultaneously, the presence of non-linearity in the circuit components introduces undesirable intermodulation and cross-talk effects which seriously impair the transmitted intelligence. Corrective means may be employed in some cases in order to compensate for the non-linearity of the circuit elements, and in these instances, it is usually of importance to know the degree of non-linearity of the circuit element or elements to be corrected.

It has been the general practice heretofore to measure the non-linearity of an electrical device by plotting its response to some parameter of an applied input signal and computing therefrom the departure from constant slope over its normal operating range. This technique, however, is unsatisfactory in that it is indirect and tedious and is not readily suited for measurements where the non-linearity is slight. In addition, it is subject to error in that it includes in the final result the non-linearity of the various components of the test apparatus.

Accordingly, it is a general object of the present invention to provide a method of and apparatus for directly and accurately measuring the non-linearity of the amplitude response characteristic of electrical devices.

Another object of the invention is to provide a method of and apparatus for directly measuring the over-all non-linearity of the input versus output voltage relationship of a frequency-modulation system including a frequency-modulation transmitter and receiver.

A specific object of the present invention is to provide a method of and apparatus for directly and accurately measuring the non-linearity of the frequency versus output voltage relationship of a frequency-modulation receiver, whereby the non-linearity of the components of the measuring apparatus are not included in the final result.

In accordance with the invention, the non-linearity of the frequency versus output voltage relationship, hereinafter called the frequency-discrimination characteristic, of a frequency-modulation receiver is measured by applying to the input of the receiver a composite signal whose mean frequency is varied cyclically at a relatively low frequency rate over a wide frequency band corresponding in width to the receiver input frequency range and whose mean frequency, in addition, is frequency modulated by a high frequency test signal over a frequency band of narrow width relative to that of the receiver operating frequency range. Stated otherwise, the signal applied to the input of the frequency-modulation receiver under test is frequency modulated by a high frequency test signal over a relatively narrow frequency band, and the frequency position of this band is continually swept back and forth across the entire input frequency range of the receiver at a relatively low frequency rate.

The frequency variations of the composite signal are translated into amplitude variations at the output of the receiver where the amplitude of the high frequency test signal has become modulated in accordance with the slope of the frequency-discrimination characteristic. The recovered high frequency test signal is then separated from the receiver output whence it is rectified to obtain its modulation envelope which is displayed on the screen of an oscilloscope as a measure of the receiver non-linearity.

The invention is also adapted to provide a parallel-trace linearity scale on the screen of the oscilloscope to enable a direct and convenient means for determining the non-linearity of the device under test.

The nature of the present invention and other objects, features, and advantages thereof will be apparent from a consideration of the following detailed description and the appended drawings illustrating the invention:

Fig. 1 is a block diagrammatic showing of the apparatus used in accordance with the invention for measuring the non-linearity of the frequency-discrimination characteristic of a frequency-modulation receiver.

Figs. 2A through 2G are curves that are useful in explaining the theory and operation of the measuring scheme of Fig. 1;

Fig. 3 is a block schematic showing of additional apparatus that may be used in the described measuring schemes to provide a double trace linearity scale on the screen of the oscilloscope;

Fig. 4 illustrates the double trace on the oscilloscope screen provided by the apparatus of Figs. 1 and 3;

Fig. 5 is a block diagrammatic showing of apparatus used in accordance with the invention for measuring the over-all system non-linearity of a frequency modulation system that includes a frequency-modulation transmitter and a frequency-modulation receiver; and Figs. 6A through 6G are curves that are useful in explaining the theory and operation of the measuring scheme of Fig. 5.

Fig. 1 illustrates the apparatus used in accordance with the invention for measuring the non-linearity of the frequency-discrimination characteristic of a frequency-modulation receiver and comprises in the relative order named the following components: a high frequency source 10 of modulating test signals, a deviation oscillator 13, a converter 15 having connected thereto a beating oscillator 16 controlled by a low frequency sweep signal source 11, the frequency-modulation receiver 19 which comprises a limiter stage 20, discriminator 21 and video amplifier 22, a narrow pass-band amplifier 23, a rectifier 25, a low-pass filter 27, and a cathode-ray oscilloscope 29.

For the purpose of setting forth a complete measuring system, it will be assumed that the frequency-modulation receiver 19 operates about a center frequency of 70 mc. and accepts input frequencies in the 65–75 mc. range. Deviation oscillator 13 and beating oscillator 16 may thus be operated about mean frequencies of 4280 and 4210 mc., respectively.

Appropriate frequency values for the high frequency test signal from source 10 and the low frequency sweep signal from source 11 may be 100 kc. and 60 cycles, respectively; the factors controlling these choices are as follows:

1. The test signal and sweep signal should be separated in frequency sufficiently to simplify their separation at the receiver output;

2. A convenient value for the low frequency sweep signal is 60 cycles, since it is readily available from commercial power sources; and 3. The test signal frequency preferably should be such that the frequency modulation sidebands which it produces by frequency modulating the mean frequency of the composite signal over the narrow frequency range mentioned hereinabove will not be spaced widely apart to obscure any fine-grain variation of the receiver frequency-discrimination characteristic. For a frequency deviation of ±150 kc., for example, a 100 kc. test signal will insure faithful reproduction of the linearity of the characteristic under test.

The pass-band of amplifier 23 is centered at 100 kc. to accept only the test signals recovered at output of 19, while the low-pass filter 27 passes only the 60-cycle modulation envelope of the recovered test signal.

Structurally, the above components of the measuring apparatus are conventional and well known in the art. Briefly, test signal source 10 may be a 100-kc. stabilized oscillator, sweep signal source 11 may be derived from a local 60-cycle power outlet, deviation oscillator 13 and beating oscillator 16 velocity variation klystrons of the Western Electric type 397-A, respectively, and converter 15 a conventional crystal microwave converter. Amplifier 23 is a conventional 100-kc. narrow band-pass amplifier, rectifier 25 a germanium crystal detector, filter 27, a low-pass filter that discriminates against high frequencies above 15 kc., for example, and CRO 29 a conventional low frequency oscilloscope provided with internal synchronization.

The equipment illustrated in Fig. 1 is used to measure the non-linearity of the frequency-discrimination characteristic of a frequency-modulation receiver as follows. A 100-kc. test signal from source 10 and a 60-cycle sweep signal from source 11 are applied to the repeller electrodes of deviation oscillator 13 and beating oscillator 16, respectively. The amplitude of the 100-kc. test signal, shown at Fig. 2A, is adjusted to vary the output of 13 at the 100-kc. rate over a narrow frequency band approximately ±150 kc. in width preferably about the center frequency of 13 where the slope of its frequency-deviation characteristic, illustrated by Fig. 2B, is substantially constant. Hence, any non-linearity appearing in the frequency-deviation characteristic of the deviation oscillator will be negligible and will not affect the measurement of the receiver linearity. The output of 13 will thus consist of a 4280-mc. microwave signal that is frequency modulated ±150 kc. at the 100-kc. rate as indicated, with relation to the Fig. 2B characteristic, by Fig. 2C.

The amplitude of the 60-cycle sweep signal is adjusted to vary the mean frequency of the beating oscillations from 16 centered at 4210 mc. over a relatively wide frequency band ±5 mc. in width at the relatively low frequency rate of 60 cycles per second. The modulated outputs of 13 and 16 are supplied to the input of the balanced crystal converter 15 whose output is tuned to 70 mc., the difference between the mean frequencies of 13 and 16. The I. F. signal at the output of 15 will be a composite signal of the form illustrated by the curve of Fig. 2D and consists of a 70-mc. signal which is uniformly modulated over a ±150-kc. frequency band at the 100-kc. rate and whose mean frequency, in addition, is varied over a ±5-mc. frequency band at a 60-cycle rate. Stated otherwise, the 70-mc. I. F. signal is frequency modulated at a 100-kc. rate over a ±150-kc. frequency band, and the frequency position of this band is continually swept back and forth across the approximately 65–75 mc. input frequency range of the frequency-modulation receiver at the relatively low frequency 60-cycle rate.

The above-described composite I. F. signal is applied to the input of the receiver 19, whose discrimination characteristic is illustrated at Fig. 2E, where the frequency variations of the composite I. F. signal illustrated by Fig. 2D are translated into amplitude variations at the 100-kc. and 60-cycle rates. The output of 19 is shown by the curve of Fig. 2F and includes a 60-cycle component of amplitude variation with a superimposed 100-kc. component, the amplitude of the latter being modulated at the 60-cycle rate in accordance with the slope and, therefore, the non-linearity of the discrimination characteristic. The narrow band-pass amplifier 23 accepts only the 100-kc. test signal component of the receiver output and delivers the recovered test signal, shown at Fig. 2G, to rectifier 25. The rectified output of rectifier 25 is then applied through low-pass filter 27 to the vertically deflecting plates 40 of the cathode-ray oscilloscope 29 whose horizontally deflecting plates 41 are supplied with an internally provided 60-cycle sweep voltage from source 42 that may be synchronized with the 60-cycle power source 11.

The modulation envelope of the recovered test signal displayed on screen 43 of oscilloscope 29 consists of a sinuous trace $a$ which represents the limits of non-linearity and is a plot of departure from constant slope versus frequency of the discriminator under test shown in Fig. 2E. Were the slope of the frequency-discrimination characteristic constant over the operating range of the frequency-modulation receiver under test the oscilloscope trace would be a horizontal line. The per cent of non-linearity will correspond to the degree of modulation of the 100-kc. signal in the receiver output and can be determined by any of the usual methods for computing the degree of modulation.

To facilitate the measurement of non-linearity, the equipment illustrated at Fig. 3 may be substituted for that part of Fig. 1 to the left of line X—X and is provided for the purpose of adding a parallel trace $b$ to the oscilloscope screen 43 as shown in Fig. 4. In Fig. 3, the output of the 100-kc. test signal source 10 is applied through two parallel paths to a two-position mercury contact relay 32, one path including an adjustable calibrated potentiometer 30 and contact 35, and the other part being a direct connection to contact 34. Normally, armature 33 rests on one contact 34, and when actuated is moved to contact 35. Relay 32 is energized by a conventional 30-cycle multivibrator 37 that is synchronized with 60-cycle source 11 as indicated by the broken line 45 in Fig. 3. Armature 33 is connected to the input of 13.

On alternate cycles of the 60-cycle signal from source 11, the 100-kc. test signal from source 10 is changed in amplitude by an adjustable percentage determined by the setting of the potentiometer 30. The oscilloscope presentation then becomes a pair of essentially parallel sinuous lines $a$, $b$ separated by a known amount $\Delta$ representing the difference in the amplitude levels of the 100-kc. signal, as illustrated at Fig. 4. If the distance $\Delta$ between the parallel traces of Fig. 4 corresponds, for example, to a 5-per cent change in amplitude of the 100-kc. signal, it thereby follows that if departures of linearity of the receiver under test are under 5 per cent, it will be possible to draw a horizontal straight line $l$ between the two traces on the oscilloscope without intersecting either trace. The magnitude of the non-linearity for a given test is determined by reducing the change in amplitude of the 100-kc. signal source until such a line may no longer be drawn without intersecting either trace. The smallest value obtained for the change in 100-kc. amplitude for which a horizontal line may be drawn, thus, directly measures the greatest departure from linearity of the frequency-discrimination characteristic.

Fig. 5 illustrates in block diagrammatic form equipment for measuring on a straight-away basis the over-all non-linearity of a frequency-modulation system including a frequency-modulated transmitter and receiver.

For the purpose of the following discussion it will be assumed that the frequency-modulation transmitter 14 of Fig. 5 includes a deviation oscillator 13, a converter 15, a beating oscillator 16 and a limiter-amplifier 17 and that the frequency-modulation receiver 19 includes an amplitude limiter 20, a discriminator circuit 21 and a video amplifier 22. Suitable forms for the above-named components are described in the article by K. D. Smith and J. F. Wentz entitled "A new microwave television system." The remaining components of the measuring apparatus of Fig. 5 also are of conventional design and may be of the same types and have the same operating frequency values, for example, as those components described in connection with Fig. 1.

The operation of Fig. 5 is as follows. A composite signal of the form illustrated at Fig. 6A consisting of a high frequency test signal component from 100-kc. source 10 and a low frequency sweep signal component from 60-cycle source 11 is applied to the repeller electrode of deviation oscillator 13 of the transmitter 14. The amplitude of the 60-cycle sweep signal component is adjusted to vary the output of 13 over its normal operating frequency range, say, from 4275 to 4285 mc. about its center frequency at the relatively low frequency rate of 60 cycles per second. The amplitude of the 100-kc. test signal component is adjusted to vary simultaneously the output of 13 over a narrow frequency range approximately ±150 kc. in width at the high frequency rate. The width of the narrow frequency band over which 13 is varied by the 100-kc. test signal is affected by the slope of the frequency deviation characteristic of 13, illustrated at Fig. 6B, and will vary in accordance with the slope of that characteristic as the frequency position of the narrow frequency band is swept, in effect, continually back and forth over the entire 4275–4285 mc. operating frequency range of 13 by the low frequency 60-cycle sweep signal.

Beating oscillator 16 is operated at a constant frequency of 4210 mc. for example, so that the I. F. signal at the output of converter 15 resulting from heterodyning the outputs of 13 and 16 in 15 will have a mean frequency of, say, 70 mc. corresponding to the mid-frequency of the input frequency range of the frequency-modulation receiver 19.

The output of transmitter 14 received by the receiver 19 is illustrated at Fig. 6D and consists of 70 mc. I. F. signal which is varied over a ±5-mc. band at a 60-cycle rate and which has superimposed thereon a smaller component of frequency variation over a narrow frequency band approximately ±150 kc. at a 100-kc. rate.

The frequency variations of the I. F. signal received by 19 are translated thereby into 60-cycle and 100-kc. amplitude variations of the form illustrated by the curve of Fig. 6F, the amplitude of the 100-kc. component being modulated in accordance with the over-all non-linearity represented by the combined slopes of the frequency-deviation characteristic of Fig. 6B, the frequency-discrimination characteristic of Fig. 6E and the non-linearity of all the factors in the system.

The narrow band 100-kc. amplifier 23 accepts only the 100-kc. test signal component of the receiver output and delivers the recovered test signal component shown at Fig. 6G to rectifier 25. The modulation envelope of the recovered test signal component appearing at the output of 25 is then applied through low pass filter 27 to the vertical deflecting plates of the cathode-ray oscilloscope 29, whose horizontal deflecting plates are supplied with an internally provided 60-cycle horizontal sweep voltage that may be synchronized internally relative to sweep signal source 11.

The percentage non-linearity represented by the modulation envelope of the recovered 100-kc. test signal displayed on the screen of the oscilloscope may be determined as explained hereinabove. The equipment illustrated at Fig. 3 and provided for the purpose of adding a double trace linearity scale to the oscilloscope display as described in connection with Fig. 1 may also be used in Fig. 5.

Although specific operating values are used in the description of the measuring schemes of Figs. 1 and 5, it is to be understood that the values are but illustrative and that the measuring methods are applicable in any frequency range with suitable changes of band width and operating parameters.

What is claimed is:

1. The method of measuring the non-linearity of the frequency-discrimination characteristic of a frequency-modulation receiver, which method includes the steps of applying to the input of said receiver a signal whose mean frequency is varied cyclically over a relatively narrow range of operating frequencies of said receiver at a high frequency rate, simultaneously sweeping the frequency position of said applied input signal continually back and forth across the entire normal operating frequency range of said receiver at a relatively low frequency rate, separating from the output of said receiver a component thereof that varies cyclically at said high frequency rate and whose amplitude is modulated in accordance with the slope of said receiver frequency-discrimination characteristic over its entire normal operating frequency range, rectifying said separated output component to obtain a voltage whose instantaneous value varies in accordance with the modulation envelope of said separated component and indicating the instantaneous values of said voltage.

2. The method of measuring the over-all non-linearity of the frequency-deviation and frequency-discrimination characteristics of a frequency-modulation system comprising a frequency-modulation transmitter and receiver, said method including the steps of applying to the input of said transmitter a composite signal having a component of modulating voltage that varies cyclically over a relatively narrow range of transmitter modulating voltage values at a high frequency rate and another component of modulating voltage that varies cyclically over the entire normal operating range of said transmitter modulating voltage values at a relatively low frequency rate, applying the output of said transmitter to said receiver, separating from the composite signal appearing at the output of said receiver a component thereof that varies cyclically at said high frequency rate and whose amplitude is modulated in accordance with the combined slopes of said frequency-deviation and frequency-discrimination characteristics over the entire normal operating range of said transmitter and receiver, rectifying said separated component to obtain a voltage whose instantaneous value varies in accordance with the modulation envelope of said separated component and indicating the instantaneous values of said voltage.

3. Apparatus for measuring the non-linearity of the frequency-discrimination characteristic of a frequency-modulation receiver, said apparatus comprising, in combination, signal generating means for deriving a composite signal having one component of cyclical frequency variation over a relatively narrow range of frequency at a first rate of repetition and another component of cyclical frequency variation substantially over the entire normal operating frequency range of said system at a second rate of repetition lower than said first rate, means for applying said composite signal to the input of said receiver, filtering means for separating from the composite signal appearing at the output of said receiver a component thereof that varies cyclically at said first rate of repetition and whose amplitude is modulated in accordance with the slope of the response characteristic of said receiver substantially over its entire normal operating frequency range, means for rectifying said separated output component to obtain a voltage whose instantaneous value varies in accordance with the modulation envelope of said separated component and means for indicating the instantaneous values of said voltage.

4. Apparatus for measuring the non-linearity of the frequency-discrimination characteristic of a frequency-modulation receiver, said apparatus comprising, in combination, means for generating frequency-modulated oscillations the mean frequency of which varies cyclically at a relatively high frequency modulating rate over a frequency band of narrow width relative to the width of the normal operating frequency range of said receiver, means for heterodyning said frequency-modulated oscillations with local oscillations the mean frequency of which varies cyclically at a relatively low frequency rate over a relatively wide frequency band corresponding in width to that of the entire normal operating frequency range of said receiver, the mean frequency of said local oscillations being different from the mean frequency of said frequency-modulated oscillations by an amount approximately equal to the mid-frequency of the operating frequency range of said receiver, means for applying the output of said heterodyning means to said receiver, filter means connected to the output of said receiver for separating a signal component thereof that varies at said high frequency modulating rate and whose amplitude is modulated in accordance with the slope of said receiver frequency-discrimination characteristic, means for rectifying the output of said filter means to obtain a voltage whose instantaneous value varies in accordance with the modulation envelope of said separated signal component and means for indicating the instantaneous values of said voltage.

5. Apparatus for measuring the non-linearity of the frequency-discrimination characteristic of a frequency-modulation receiver, said apparatus comprising, in combination, a first variable frequency source of oscillations, a source of high frequency modulating signals of adjustable amplitude connected to the input of said first oscillator to vary the frequency of said first oscillator cyclically over a frequency band of narrow width relative to the width of the normal operating frequency range of said receiver, a second variable source of oscillations of frequency different from said first oscillator by an amount approximately equal to the mid-frequency of the operating frequency range of said receiver, a source of relatively low frequency sweep signals of adjustable amplitude connected to the input of said second oscillator to vary the frequency of said second oscillator cyclically over a relatively wide frequency band corresponding in width to that of the entire normal operating frequency range of said receiver, heterodyning means connected to receive the outputs of said first and second oscillators, means for applying the output of said heterodyning means to said receiver, filter means connected to the output of said receiver to pass a signal component thereof of the same frequency as said high frequency modulating signals, rectifying means connected to the output of said filter means and indicating means connected to the output of said rectifying means.

6. The combination in accordance with claim 5 wherein said indicating means comprises a cathode-ray oscilloscope having one pair of deflecting plates connected to the output of said rectifying means and another pair of deflecting plates connected to said source of low frequency sweep signals.

7. The combination in accordance with claim 5 wherein said indicating means comprises a cathode-ray oscilloscope whose vertical deflecting plates are connected to the output of said rectifying means and whose horizontal deflecting plates are connected to an internal source of low frequency sweep signals synchronized with said low frequency sweep signals connected to said second oscillator.

8. The combination in accordance with claim 7 including means for changing the amplitude of said modulating test signals applied to said first variable frequency oscillator on alternate cycles of said low frequency sweep signals applied to said second variable frequency oscillator, said means including an adjustable potentiometer, a two-position relay and means for energizing said relay at half the frequency rate of said low frequency signals, said relay having one contact connected directly to the output of said test signal source and another contact connected to said test signal source through said potentiometer, the armature of said relay being connected to the input of said first variable frequency oscillator and normally resting on one of said contacts and when energized on the other of said contacts.

9. Apparatus for measuring the non-linearity of the frequency-deviation and frequency-discrimination characteristics of a frequency-modulation system which includes a frequency-modulation transmitter and receiver, said apparatus comprising, in combination, a first source of modulating test signals that vary cyclically at a first rate of repetition over a narrow portion of the operating range of modulating voltage values of said transmitter frequency-deviation characteristic, a second source of modulating signals that vary cyclically at a second rate of repetition lower than said first rate over the entire normal operating range of modulating voltage values of said transmitter frequency-deviation characteristic, means for applying the outputs of said first and second sources simultaneously to said transmitter, means for applying the output of said transmitter to said receiver, filtering means connected to the output of said receiver for separating from the output thereof a signal that varies cyclically at said first rate of repetition and whose amplitude is modulated in accordance with the combined slopes of said frequency-deviation and frequency-discrimination characteristics, means for rectifying said separated signal to obtain a voltage whose instantaneous value varies in accordance with the modulation envelope of said separated signal and means for indicating the instantaneous values of said voltage.

10. The combination in accordance with claim 9 wherein said indicating means comprises a cathode-ray oscilloscope having one pair of deflecting plates connected to the output of said rectifying means and another pair of deflecting plates connected to said second source of modulating signals.

11. The combination in accordance with claim 9 wherein said indicating means comprises a cathode-ray oscilloscope whose vertical deflecting plates are connected to the output of said rectifying means and whose horizontal deflecting plates are connected to an internal source of sweep signals synchronized with said second source of modulating signals.

12. The method of measuring the non-linearity of a frequency versus modulating voltage characteristic of a frequency modulation device, which comprises simultaneously applying two modulating voltages of different frequency and magnitude to said device to vary the frequency of the voltage thereof over two different frequency ranges at two different cyclic rates of repetition such that the frequency of the smaller frequency range is changed at the larger cyclic rate of repetition under control of said characteristic of said device as the smaller frequency range is swept across a larger frequency range at the smaller cyclic rate of repetition, translating the voltages representing the two different frequency ranges into a component corresponding to the larger cyclic rate of repetition and varying in amplitude in accordance with said characteristic of said device, and measuring the component as a representative of the non-linearity of said characteristic of said device.

References Cited in the file of this patent

UNITED STATES PATENTS

| Number | Name | Date |
| --- | --- | --- |
| Re. 22,150 | Bagno et al. | Aug. 4, 1942 |
| 2,189,457 | Archer | Feb. 6, 1940 |
| 2,215,197 | Sherman | Sept. 17, 1940 |
| 2,495,997 | Ames | Jan. 31, 1950 |
| 2,578,714 | Martin | Dec. 18, 1951 |